Dec. 20, 1960         E. DRYDEN         2,965,415
MULTIPLE SHIELD SUN VISOR FOR VEHICLES
Filed June 30, 1958                         2 Sheets-Sheet 1
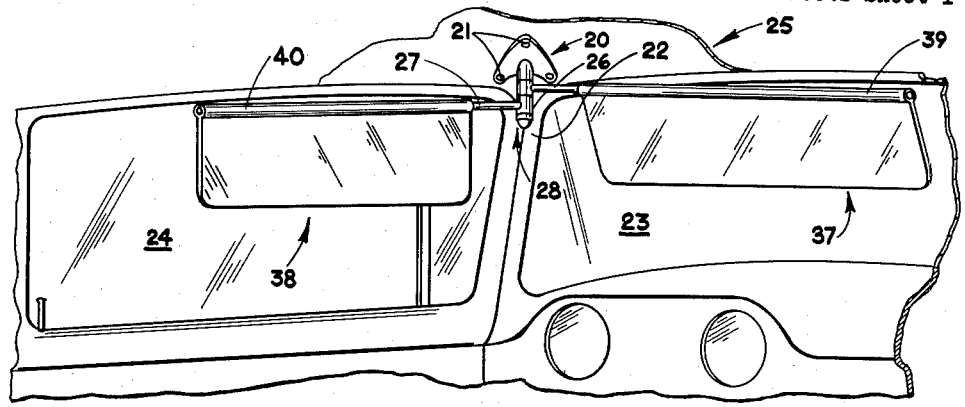
Fig. 1
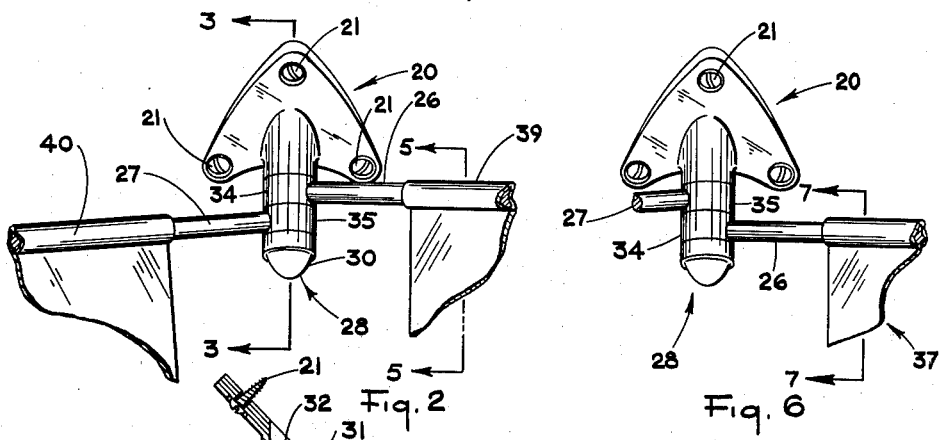
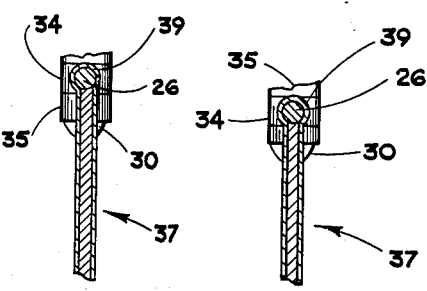
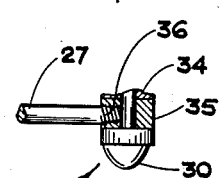
Fig. 4
INVENTOR.
EVA DRYDEN Dec. 20, 1960      E. DRYDEN      2,965,415
MULTIPLE SHIELD SUN VISOR FOR VEHICLES
Filed June 30, 1958      2 Sheets-Sheet 2
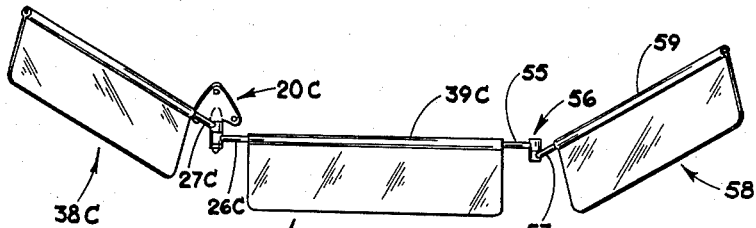
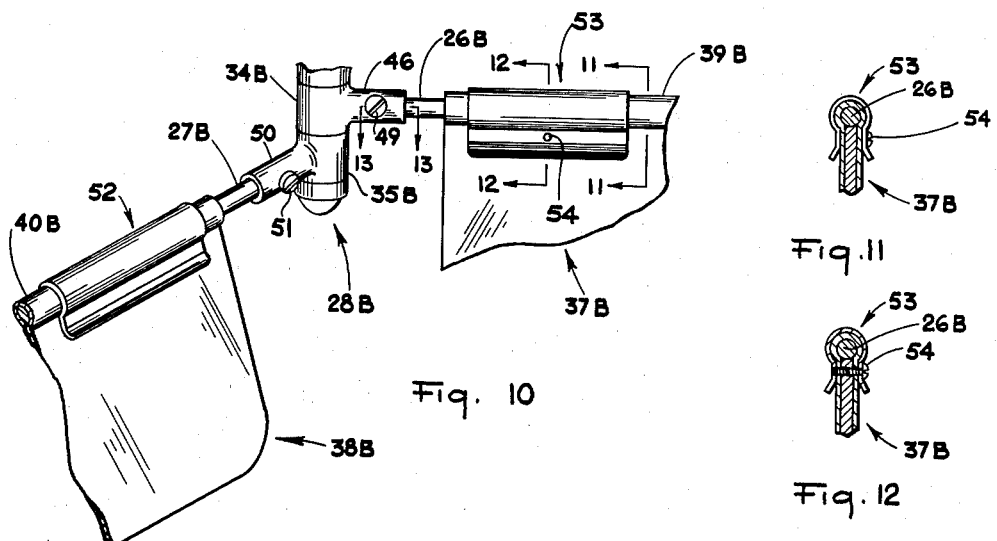
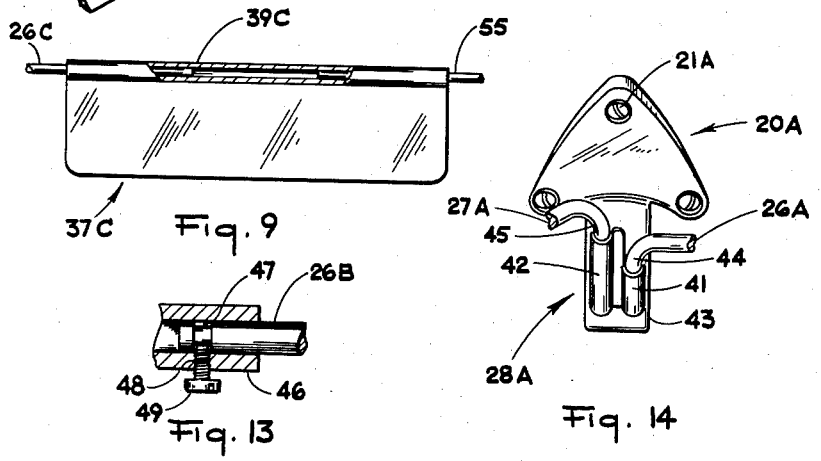
INVENTOR.
EVA DRYDEN

United States Patent Office 2,965,415
Patented Dec. 20, 1960

2,965,415

MULTIPLE SHIELD SUN VISOR FOR VEHICLES

Eva Dryden, 11952 Cantara St., North Hollywood, Calif.

Filed June 30, 1958, Ser. No. 745,710

2 Claims. (Cl. 296—97)

Generally speaking, the present invention relates to an improved multiple shield sun visor for vehicles such as automobiles or the like, although not so limited. It consists of a mounting bracket adapted to be fastened to the vehicle (usually to the front upper inside corner of the passenger-carrying body of the vehicle) and includes at least two substantially flat glare shields independently pivotally mounted for horizontal arcuate movement with respect to a vertical axis adjacent the mounting bracket. Each glare shield is rotatable around a substantially horizontal support arm carrying the shield, and is also longitudinally slidable with respect to the mounting bracket for extension and retraction with respect thereto along the corresponding horizontal glare shield support arm. Thus, it can be seen that the improved multiple shield sun visor of the present invention provides an arrangement which can usually be so positioned in several different locations as to effectively shield the eyes of a driver of an automobile or other vehicle from the sun or other source of glare and in a manner incapable of attainment with customary prior art single shield sun visors for automobiles and other similar vehicles.

With the above points in mind, it is an object of the present invention to provide an improved multiple shield sun visor for vehicles including at least two glare shields horizontally pivotally carried by horizontal support arms hingedly attached to a single mounting bracket and each being rotatable around its support arm and extensible and retractable along the length thereof whereby to provide a sun visor apparatus for vehicles capable of being adjusted in several different ways to provide the maximum and optimum type of glare shielding effect for the eyes of an occupant of a vehicle.

It is a further object of the present invention to provide an improved multiple shield sun visor for vehicles of the type set forth in the preceding object, wherein the horizontal arms carrying the two visors pivot with respect to the mounting bracket in two different vertically spaced horizontal planes whereby the two glare shields lie closely adjacent to each other in slightly different vertical positions when folded up in non-use storage positions.

It is a further object of the present invention to provide an improved multiple shield sun visor for vehicles of the type set forth in either of the preceding objects, wherein one of said glare shields carries, adjacent an end thereof remote from its attachment to said first mounting bracket, another longitudinally slidable and rotatably engaged support arm rotatably carrying an additional support arm rotatively and longitudinally slidably mounting a third glare shield for rotation about a vertical pivotal axis, thereby providing an arrangement wherein the upper portions of the front and each side of the field of vision of an occupant of a vehicle carrying the multiple shield sun visor can be effectively screened from glare.

It is a further object of the present invention to provide a multiple shield sun visor for vehicles of the type set forth in any of the preceding objects including clamp means for adjusting the rotative and longitudinal slidable frictional engagement of any of the glare shields with respect to any of the support arms to provide optimum frictional engagement therebetween.

Other and allied objects will be apparent to those skilled in the art after a careful study of the accompanying drawings, the present specification, and the appended claims.

To facilitate understanding, reference will be made to the hereinbelow-described drawings, in which:

Fig. 1 is a perspective view showing one illustrative embodiment of the present invention in preferred mounting position with respect to the front upper inside corner of the passenger-carrying body of an automobile (with the automobile being shown in fragmentary form only) and with the two glare shields positioned respectively in glare shielding relationship to the left side window of the automobile and with respect to the front window of the automobile to provide effective glare shielding action for the eyes of a driver of the vehicle;

Fig. 2 is an enlarged fragmentary perspective view of the mounting bracket and hinge means adapted to mount the two horizontal support arms and glare shields (both of which are shown in fragmentary form) in the positions shown in Fig. 1;

Fig. 3 is a vertical sectional view of the mounting bracket and hinge means taken in the direction of the arrows 3—3 in Fig. 2;

Fig. 4 is a fragmentary partly vertical sectional view showing the attachment of the left support arm shown in Fig. 2 with respect to the hinge means carried by the mounting bracket—it being understood that the attachment of the right support arm is similar;

Fig. 5 is a fragmenary sectional view taken in the direction of the arrows 5—5 in Fig. 2 and illustrates the slidable and rotative mounting of the right glare shield in Fig. 2 on the right support arm—it being understood that the left glare shield, shown in fragmentary form in Fig. 2, is similarly mounted on the left support arm;

Fig. 6 is a fragmentary perspective view similar to Fig. 2 but illustrates a slight modification thereof wherein the leftwardly directed support arm is hinged with respect to the mounting bracket above the rightwardly directed support arm, thereby reversing the vertical relationship of the two support arms as shown in Fig. 2;

Fig. 7 is a fragmentary vertical sectional view taken in the direction of the arrows 7—7 in Fig. 6;

Fig. 8 is a reduced scale perspective view showing a modified form of the invention illustrated in Fig. 1 wherein a third glare shield is slidably and rotatably mounted at the right end of the centrally positioned glare shield in an arrangement such that when mounted in an automobile in the general manner of the first form of the invention illustrated in Fig. 1, the upper portions of the front, the left, and the right sides of the field of vision of the driver of a vehicle will be adequately protected from glare;

Fig. 9 is a slightly enlarged fragmentary partly broken away view of the central glare shield shown in Fig. 8 and illustrates the slidable and rotative mounting of the additional support arm carried at the top of the central glare shield;

Fig. 10 is a fragmentary enlarged perspective view somewhat similar to Fig. 2 but illustrates a slight modification of the invention wherein the left and right support arms are mounted with respect to the hinge means in a slightly different manner than in the first form of the present invention and wherein each of the glare shields is, for illustrative purposes, provided with a slightly different type of clamp means for positively maintaining effective engagement of the top edge of each of the glare shields in its rotatively encompassing and longitudinally slidable encircling frictional engagement with each of the support arms—it being understood that, in actual use, each glare shield would normally have similar clamp means rather than the different clamp means which are shown in Fig. 10 for illustrative purposes only;

Fig. 11 is a fragmentary view, partly in vertical section and partly in elevation, taken in the direction of the arrows 11—11 in Fig. 10;

Fig. 12 is a fragmentary vertical sectional view taken in the direction of the arrows 12—12 in Fig. 10;

Fig. 13 is an enlarged fragmentary horizontal sectional view taken in the direction of the arrows 13—13 in Fig. 10; and Fig. 14 is a fragmentary perspective view somewhat similar to Fig. 2 but illustrates a slightly different type of pivotal mounting or hinge means for each of the two support arms whereby they are mounted for vertical rotation about horizontally displaced vertical axes.

The multiple shield sun visor for vehicles of the present invention includes a mounting bracket adapted to be fastened to a vehicle. In the specific example illustrated in Figs. 1–5, said mounting bracket is indicated generally at 20 and is adapted to be mounted by fastening means taking the form of three fastening screws 21 to the front upper inside corner of the passenger-carrying body of an automobile in a position above the post 22 which is between the front window 23 of the automobile and the left side window 24 thereof in a position adjacent the junction of the two upper adjacent front corners of the front window 23 and the left window 24 of the automobile body, which is indicated generally in fragmentary form at 25 in Fig. 1.

Also, the present invention includes a first horizontally directed support arm pivotally attached to the mounting bracket for horizontal arcuate pivotal movement around a vertical axis, and a second substantially horizontally directed support arm pivotally attached to said mounting bracket for horizontal arcuate pivotal movement around a vertical axis. In the specific example illustrated in Figs. 1–5, said first horizontally directed support arm is indicated at 26 and said second horizontally directed support arm is indicated at 27 and each of said horizontal support arms 26 and 27 is pivotally attached to the mounting bracket by hinge means indicated generally at 28 carried by the mounting bracket 20. In the specific example illustrated in Figs. 1–5, the hinge means 28 includes a vertical bolt member 29 having an enlarged head 30 at the bottom thereof and a retaining nut 31 on the threaded upper end 32 thereof with washers 33 thereunder and abutting a portion of the mounting bracket 20, with the shaft portion 29 of the bolt extending downwardly through a circular hinge portion 34 and another circular hinge portion 35, with each of the hinge portions 34 and 35 being frictionally rotatably mounted on the vertical shaft 29 of the bolt in a manner whereby the degree of frictional engagement thereof with respect to the shaft 29 of the bolt may be adjusted by tightening the nut 31 to any desired degree. It should be noted that the upper circular hinge portion 34 is connected to the first support arm 26 and the lower circular hinge portion 35 is connected to the second support arm 27. The connections of the support arms 26 and 27 to the respective circular hinge portions 34 and 35 are identical but only the connection of the left support arm 27 to its circular hinge portion 35 is specifically illustrated, since they are both alike. This is clearly shown in Fig. 4 wherein the left support arm 27 has a tapered threaded end 36 which is threaded into the corresponding threaded receiving aperture in the rotative hinge portion 35 whereby to effectively mount the second support arm 27 with respect to the rotative circular hinge portion 35.

Also, the present invention includes a first glare shield having its top edge in rotatively encompassing longitudinally slidable encircling frictional engagement with said first support arm, and additionally includes a second glare shield having its top edge in rotatively encompassing longitudinally slidable encircling frictional engagement with said second support arm. One version of this type of engagement of each of the glare shields with respect to each of the support arms is shown in Figs. 1–7 wherein said first glare shield is of substantially flat rectangular form and is indicated at 37 and said second glare shield is also of substantially flat rectangular form and is indicated at 38. It will be noted that each of said glare shields 37 and 38 has a top edge 39 and 40, respectively, which frictionally rotatively encompasses and longitudinally slidably encircles the corresponding support arms 26 and 27 tightly enough to provide sufficient frictional engagement therebetween to make it possible to rotatively position either of the glare shields 37 or 38 in any selected position around the corresponding support arm 26 or 27, where it will be frictionally retained, and also to allow either of the glare shields 37 or 38 to be longitudinally slidably extended or retracted along the length of the corresponding support arm 26 or 27, where it will be retained in any selected position. Thus, it can be seen that the arrangement will make it possible to very effectively screen glare from the eyes of a driver of the vehicle when the two glare shields 37 and 38 are in the positions shown in Fig. 1. Also, it will readily be understood that they can be adjusted to any other desired positions within the range of their permissible movement provided by their mountings on the longitudinal support arms 26 and 27 and the hinge means 28.

It should be noted that Figs. 6 and 7 merely illustrate an alternate arrangement of the structure shown in Fig. 2 wherein the first support arm 26 and the hinge portion 34 to which it is attached are positioned below the second support arm 27 and the hinge portion 35 to which it is attached, thus providing an arrangement whereby the left glare shield and support arm 27 may be swung from its position adjacent the left window (such as shown at 24 in Fig. 1) into a position immediately in front of the right glare shield 37 and support arm 26 positioned in front of the front window of an automobile, such as is shown at 23 in Fig. 1, whereupon both glare shields may be simultaneously pivotally swung around their support arms 26 and 27 into a position immediately underlying the roof of the automobile for convenient storage during periods of non-use.

Fig. 14 illustrates a slight modification of the hinge means shown in Fig. 2 and similar parts will be indicated by the same reference numerals, followed by the letter "A." In this modification, the mounting bracket 20A carries hinge means 28A which consists of two vertically apertured members 41 and 42 carried by a plate 43 comprising a downward extension of the mounting bracket 20A, and with said apertured members 41 and 42 being adapted to receive the downwardly bent lower ends 44 and 45, respectively, of the first support arm 26A and the second support arm 27A, respectively, whereby to mount each of said support arms for vertical pivotal movement with respect to the mounting bracket 20A, but about two different vertical axes which are horizontally displaced from each other.

Figs. 10, 11, and 12 illustrate another modification of the hinge means carried by the mounting bracket shown in Fig. 2 and also show two different forms of clamp means for positively providing for the maintenance of continued frictional engagement between the top edges of each of the glare shields with respect to the corresponding support arms. In this modification of the invention, corresponding parts will be indicated by the same reference numerals, followed by the letter "B." In this version, each of the support arms 26B and 27B is fastened to its rotative hinge portion 34B and 35B respectively in a slightly different manner than the first form of the present invention illustrated in Figs. 2, 3, and 4. In this modification, the upper hinge portion 34B is provided with a horizontally apertured extension 46 adapted to receive therein the end of the support arm 26B, which has an annular groove 47 therein. The extension 46 is provided with a threaded transverse aperture 48 receiving a threaded fastening screw 49, which is threadedly advanced into the annular recess 47 whereby to retain the inner end of the support arm 26B within the extension 46. This provides an arrangement wherein the support arm may be positively locked against longitudinal movement and against rotative movement or may be positively locked against longitudinal movement but provided with a desired degree of frictional rotative movement, whereby rotative movement of any of the glare shields with respect to the mounting bracket and hinge means may be accomplished by means of the adjusting screw and groove arrangement 49 and 47. The lower hinge portion 35B is similarly provided with an extension 50 and an adjusting screw 51 cooperating with an annular groove (not shown) at the inner end of the second support arm 27B in the same manner as that just described in connection with the first support arm 26B and clearly shown in Fig. 13.

The second glare shield 38B shown in Fig. 10 is provided with a resilient clamp 52 which may be made of metal, plastic, or the like, which resiliently grips the top edge 40B of the glare shield 38B whereby to provide a different means than shown in the first form of the invention for maintaining positive frictional engagement between said top edge 40B and said support arm 27B to allow rotative and/or longitudinal movement of the glare shield 38B while providing sufficient friction to cause the glare shield 38B to be maintained in whatever position it is left in.

The first glare shield 37B shown in Fig. 10 is provided, for illustrative purposes only (since normally the same type of clamp would be used on each glare shield) with a slightly different type of clamp 53 encompassing the top edge 39B of the first glare shield 37B and having an adjusting screw 54 to make it possible to adjust the degree of frictional engagement between said top edge 39B of the glare shield 37B and the support arm 26B for the purposes already set forth.

Figs. 8 and 9 illustrate a modified form of the present invention and similar parts will be indicated by the same reference numerals, followed by the letter "C." In this modification, the top edge 39C of the center or first glare shield 37C has rotatively and slidably engaged therein a third support arm 55, which extends to the right to the upper member of a pivotal coupling 56 which has its lower member provided with a fourth support arm 57 rotatively mounted with respect to said third support arm 55 by means of the pivotal coupling 56 for rotation around a vertical axis. This modification of the invention also has a third glare shield 58 having its top edge 59 rotatively and longitudinally slidably and frictionally encompassing said fourth support arm 57 whereby to provide for relative rotation, extension, and retraction of the third glare shield 58 with respect to said fourth support arm 57 in the general manner hereinbefore described in connection with the first and second glare shields. Thus it will be seen that this modification of the invention provides an arrangement whereby the three glare shields can be readily positioned so as to protect the upper portions of the front and left and right sides of the field of view of the driver of an automobile from direct sun glare or the like.

It should be noted that the mounting bracket, hinge means, and support arms disclosed herein may preferably be made of metal but are not necessarily limited to metallic construction but may be made of plastic or other suitable materials. Furthermore, it should be noted that the glare shields may be made of plastic, fabric, or various combinations of plastic, fabric, or other suitable materials, and may be opaque, translucent, or partially transparent, if desired.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

I claim:

1. A multiple shield sun visor for automobiles, comprising: a mounting bracket adapted to be fastened to the upper inside corner of the passenger-carrying body of an automobile; a first substantially horizontally directed support arm pivotally attached to said mounting bracket for horizontal arcuate pivotal movement around a vertical axis; a second substantially horizontally directed support arm pivotally attached to said mounting bracket for horizontal arcuate pivotal movement around a vertical axis; a first substantially flat glare shield having its top edge in rotatively encompassing longitudinally slidable encircling frictional engagement with said first support arm; a second substantially flat glare shield having its top edge in rotatively encompassing longitudinally slidable encircling frictional engagement with said second support arm; a third support arm also in longitudinally slidable rotative engagement within said encircling top edge of said first shield; a fourth support arm rotatively mounted with respect to said third support arm for rotation around a vertical axis; and a third substantially flat glare shield having its top edge in rotatively encompassing longitudinally slidable encircling frictional engagement with said fourth support arm.

2. A multiple shield sun visor for automobiles, comprising: a mounting bracket adapted to be fastened to the upper inside corner of the passenger-carrying body of an automobile adjacent the junction of the upper adjacent corners of the front and one side window of the automobile; a first substantially horizontally directed support arm pivotally attached to said mounting bracket for horizontal arcuate pivotal movement around a vertical axis; a second substantially horizontally directed support arm pivotally attached to said mounting bracket for horizontal arcuate pivotal movement around a vertical axis in a horizontal plane vertically displaced from the horizontal plane of arcuate movement of said first support arm; a first substantially flat substantially rectangular glare shield having its top edge in rotatively encompassing longitudinally slidable encircling frictional engagement with said first support arm; a second substantially flat substantially rectangular glare shield having its top edge rotatively encompassing longitudinally slidable encircling frictional engagement with said second support arm; a third support arm also in longitudinally slidable rotative engagement within said encircling top edge of said first shield; a fourth support arm rotatively mounted with respect to said third support arm for rotation around a vertical axis; and a third substantially flat substantially rectangular glare shield having its top edge in rotatively encompassing longitudinally slidable encircling frictional engagement with said fourth support arm.

References Cited in the file of this patent

UNITED STATES PATENTS

| | | |
|---|---|---|
| 417,959 | Welton | Dec. 24, 1889 |
| 1,559,183 | Phillips | Sept. 7, 1926 |
| 2,153,095 | McKinley | Apr. 4, 1939 |
| 2,261,881 | Horstmann | Nov. 4, 1941 |
| 2,628,125 | Jacobs | Feb. 10, 1953 |
| 2,634,161 | Beets | Apr. 7, 1953 |
| 2,673,118 | Phelps | Mar. 23, 1954 |

FOREIGN PATENTS

| | | |
|---|---|---|
| 1,132,147 | France | Oct. 29, 1956 |